(12) United States Patent
Yamamoto et al.

(10) Patent No.: US 10,373,036 B2
(45) Date of Patent: Aug. 6, 2019

(54) REMOTE CONTROL FOR AIR CONDITIONER AND AIR CONDITIONER PROVIDED WITH SAME

(71) Applicant: DAIKIN INDUSTRIES, LTD., Osaka-shi, Osaka (JP)

(72) Inventors: Ryousuke Yamamoto, Osaka (JP); Asuka Yagi, Osaka (JP); Yukio Inoue, Osaka (JP); Ryouji Inoue, Osaka (JP); Youta Katou, Osaka (JP); Tatsuya Higuchi, Osaka (JP); Takeshi Yoshimura, Osaka (JP); Yasuaki Kobayashi, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/558,619

(22) PCT Filed: Mar. 14, 2016

(86) PCT No.: PCT/JP2016/001415
§ 371 (c)(1),
(2) Date: Sep. 15, 2017

(87) PCT Pub. No.: WO2016/157763
PCT Pub. Date: Oct. 6, 2016

(65) Prior Publication Data
US 2018/0080672 A1    Mar. 22, 2018

(30) Foreign Application Priority Data
Apr. 1, 2015    (JP) .................. 2015-075479

(51) Int. Cl.
*G06F 19/00*    (2018.01)
*G06K 19/07*    (2006.01)
(Continued)

(52) U.S. Cl.
CPC .......... *G06K 19/0723* (2013.01); *F24F 11/30* (2018.01); *F24F 11/59* (2018.01);
(Continued)

(58) Field of Classification Search
CPC .. F24F 11/62; F24F 11/30; F24F 11/89; F24F 11/64; G06K 19/0723
See application file for complete search history.

(56) References Cited

U.S. PATENT DOCUMENTS 6,177,860 B1 * 1/2001 Cromer ............... G06F 9/44505
340/10.1
6,873,259 B2 * 3/2005 Teraura .............. G06K 19/0723
235/375
(Continued)

FOREIGN PATENT DOCUMENTS

CN    203671833 U    6/2014
CN    104423301 A    3/2015
(Continued)

OTHER PUBLICATIONS

International Search Report, issued in PCT/JP2016/001415, PCT/ISA/210, dated May 10, 2016.
(Continued)

*Primary Examiner* — Michael D Masinick
(74) *Attorney, Agent, or Firm* — Birch, Stewart, Kolasch & Birch, LLP

(57) ABSTRACT

A remote control for an air conditioner facilitates setting of various kinds of data without operation of a button. A remote control (30) includes an external communication unit (45) having an NFC circuit (42) and an NFC antenna (43). The external communication unit (45) is capable of wirelessly communicating with an external apparatus even when a microcomputer (36) in the remote control (30) is not supplied with power (i.e., in a non-operating state). Hence,
(Continued)

through the wireless communication between the external communication unit (45) of the remote control (30) and the external apparatus, the various kinds of data is forwarded from the external device to the remote control (30), and stored in the remote control (30).

6 Claims, 5 Drawing Sheets

(51) Int. Cl.
    *F24F 11/89*     (2018.01)
    *F24F 11/62*     (2018.01)
    *F24F 11/30*     (2018.01)
    *F24F 11/59*     (2018.01)
    *F24F 11/64*     (2018.01)

(52) U.S. Cl.
    CPC .............. *F24F 11/62* (2018.01); *F24F 11/89* (2018.01); *F24F 11/64* (2018.01)

(56) References Cited

U.S. PATENT DOCUMENTS

| | | | |
|---|---|---|---|
| 6,876,295 B1* | 4/2005 | Lewis | H04B 5/0062 340/10.1 |
| 7,183,924 B1* | 2/2007 | Ku | G06Q 10/087 340/568.1 |
| 2004/0117069 A1* | 6/2004 | Yoon | F24F 11/30 700/276 |
| 2005/0204758 A1* | 9/2005 | Kwon | H04L 12/2818 62/175 |
| 2006/0279412 A1* | 12/2006 | Holland | G06K 17/00 340/10.51 |
| 2008/0041930 A1* | 2/2008 | Smith | G06F 9/44505 235/375 |
| 2010/0106308 A1* | 4/2010 | Filbeck | G05B 15/02 700/276 |
| 2012/0117344 A1* | 5/2012 | Kim | G06F 9/4418 711/162 |
| 2012/0302166 A1 | 11/2012 | Yamaoka et al. | |
| 2014/0130524 A1* | 5/2014 | Kim | F24F 11/30 62/56 |
| 2015/0081103 A1 | 3/2015 | Song et al. | |

FOREIGN PATENT DOCUMENTS

| | | | | |
|---|---|---|---|---|
| EP | 1426703 A1 * | 6/2004 | | F24F 11/30 |
| EP | 2 716 988 A2 | 4/2014 | | |
| JP | 10-232044 A | 9/1998 | | |
| JP | 2011-69561 A | 7/2011 | | |
| JP | 2012-242033 A | 12/2012 | | |
| JP | 2013-50223 A | 3/2013 | | |

OTHER PUBLICATIONS

Written Opinion of the International Searching Authority, issued in PCT/JP2016/001415, PCT/ISA/237, dated May 10, 2016.

Extended European Search Report dated Oct. 18, 2018 in corresponding European Application No. 16771657.0.

* cited by examiner

REMOTE CONTROL FOR AIR CONDITIONER AND AIR CONDITIONER PROVIDED WITH SAME

TECHNICAL FIELD

The present invention relates to an improvement in a remote control for an air conditioner and, in particular, to facilitation of setting, for example, data on the remote control for air conditioning.

BACKGROUND ART

In a typical setting of, for example, data for air conditioning on a remote control, an operator directly operates a button of a remote control to set the data for the air conditioner on the remote control.

For example, in a building multi-system functioning as an air conditioner and including one outdoor unit and dozens of indoor units connected to the outdoor unit, the indoor units are installed in respective many rooms on each of the floors of a building. A remote control is connected to each of the indoor units. The remote control is then turned ON, and installed on the indoor unit. After that, the building multi-system performs centralized control of these indoor units on the floors. In this configuration, when setting an address of each of the indoor units on a central monitoring board, the operator visits each room and repeatedly sets the address, of the corresponding indoor unit, on the remote control of the room, and makes notes of the addresses of the indoor units. Then, when setting of all the addresses ends, the operator re-enters, into the central monitoring board, the addresses of the indoor units set on the remote controls for the indoor units.

Moreover, when the remote control is set to display time and organize a schedule such as a time setting for air conditioning after the remote control is turned ON, the operator operates the button of the remote control many times for every setting.

However, operating the button is extremely troublesome. In particular, if many remote controls are used as seen especially in a building multi-system, a drawback is that setting data is troublesome and takes long time.

Patent Document 1 discloses, for example, a typical configuration in which a central processing unit (CPU) included in a remote control is connected to an external personal computer (PC) via a communication port, and data on an operation control factor is transmitted from the external PC to the CPU of the remote control.

CITATION LIST

Patent Document

PATENT DOCUMENT 1: Japanese Unexamined Patent Publication No. 10-232044

SUMMARY OF THE INVENTION

Technical Problem

In the typical configuration, the remote control needs to be kept ON from necessity to operate the CPU of the remote control. Hence, if a remote control cannot be turned ON until the remote control is connected to an indoor unit, installed, and supplied with power from an indoor unit, the remote control has a drawback: the remote control cannot receive data from an external PC before the installation. Hence, for example, in a building multi-system, such a technique still cannot free an operator from visiting each room and repeatedly operating a button of the remote control of the room.

The present invention is conceived in view of the problems and attempts to facilitate setting various kinds of data on a remote control for an air conditioner without operation of a button of the remote control even though a controller such as a microcomputer in the remote control is OFF and in a non-operating state.

Solution to the Problem

In order to carry out the above attempt, a remote control for an air conditioner in the present invention uses such a communication unit as a radio frequency identification (RFID) including, for example, near field communication (NFC) capable of exchanging data in short range communication.

Specifically, a remote control for an air conditioner according to a first aspect contains a controller (36) and a main storage unit (41) in which setup data for air conditioning is stored. The remote control includes: an external communication unit (45) capable of communicating with an external apparatus even when the controller (36) is not supplied with power, the external apparatus being different from the air conditioner; and an auxiliary storage unit (42a) in which communication data obtained by the external communication unit (45) through communication with the external apparatus is stored In the first aspect, the external communication unit can communicate with the external apparatus even when the controller such as a microcomputer is not supplied with power. Such a feature makes it possible for the remote control to receive various kinds of data previously set on the external apparatus, and to store the received data in the auxiliary storage unit included in the remote control.

Hence, in a building multi-air-conditioning system, many remote controls are brought together and placed in one predetermined room. Then, using the external apparatus, an operator writes, for each remote control, a predetermined address in the auxiliary storage unit through the external communication unit of the remote control. When such a process is simply repeated in collective address setting before the remote controls are connected to the corresponding indoor units installed in the respective rooms, addresses may be collectively set on many remote controls. The collective address setting frees the operator from a typical work: after a remote control is connected to, and installed on, each indoor unit, the operator visits each room, and operates a button of the remote control to set an address with the remote control supplied with power from the indoor unit.

Moreover, when the remote control is to display the time after the installation, the operator may write such data as time data from the external apparatus in the auxiliary storage unit via the external communication unit. Thus, also in this case, the operator is free from operating a button of the remote control for time display setting.

In a second aspect of the remote control for the air conditioner, the external communication unit (45) may communicate with the external apparatus separately from operation of the controller (36), and store the communication data in the auxiliary storage unit (42a).

In the second aspect, the remote control communicates with the external apparatus separately from operation of the controller. Hence, even if the controller is not supplied with power and in a non-operating state, the external communication unit is, for example, supplied with power from the external apparatus when communicating with the external apparatus, receives communication data from the external apparatus, and stores the communication data in the auxiliary storage unit. Thus, even when the remote control is OFF, the communication data on the external apparatus may be forwarded without operation of a button to the auxiliary storage unit included in the remote control.

In a third aspect of the remote control for the air conditioner, the controller (36) may be supplied with the power when the remote control (30) is turned ON, read out the communication data stored in the auxiliary storage unit (42a) as the external communication unit (45) communicates with the external apparatus, reflect setting of the remote control (30) if the communication data is for the setting, and store the communication data in the main storage unit (41).

In the third aspect, the controller such as a microcomputer is ready to operate when the remote control is turned ON, and may determine what the communication data stored in the auxiliary storage unit is like. Thus, if the stored communication data is for setting of the remote control, the controller reflects the setting and stores the communication data in the main storage unit. Hence, the controller may reflect, for example, setting of a brightness and a contrast value of the LCD of the remote control at, for example, an initial operation of the remote control.

In a fourth aspect of the remote control for the air conditioner, the controller (36) may be supplied with the power when the remote control (30) is turned ON, read out the communication data stored in the auxiliary storage unit (42a) as the external communication unit (45) communicates with the external apparatus, and forward the communication data outside via a communication port (31) if the communication data is not for the setting of the remote control (30).

In the fourth aspect, the controller such as a microcomputer is ready to operate when the remote control is turned ON, and may determine what the communication data stored in the auxiliary storage unit is like. Thus, if the stored communication data is not for setting of the remote control, the controller may transfer the communication data (the setup data) through the communication port to an indoor unit, an outdoor unit, and a centralized apparatus placed outside. Hence, in the building multi-air-conditioning system, the addresses set on the corresponding many remote controls may be transferred from the remote controls to the indoor units, the outdoor units, or the centralized apparatus.

In a fifth aspect, the remote control for the air conditioner may include a protector (42c) protecting, when the remote control (30) is OFF, the controller (36) from an effect of power required for the external communication unit (45) to communicate with the external apparatus.

In the fifth aspect, the external communication unit may communicate with the external apparatus when the remote control is OFF. However, in the communication, the protector keeps the turned-OFF controller unaffected by the power required for the operation of the external communication unit. Hence, the power is supplied only to the external communication unit, and data communication is secured between the external communication unit and the external apparatus.

In a sixth aspect of the remote control for the air conditioner, when the controller (36) stores new communication data in the auxiliary storage unit (42a) as the external communication unit (45) communicates with the external apparatus after the remote control (30) is turned ON, if the new communication data is for the setting of the remote control (30), the controller (36) may reflect the setting, and store the new communication data in the main storage unit (41).

In the sixth aspect, the controller changes into the operating state after the remote control is turned ON. Then, when new communication data is stored from the external communication unit into the auxiliary storage unit via the external communication unit, if the new communication data is for the setting of the remote control, the controller reflects the setting, and transfers the communication data from the auxiliary storage unit to the main storage unit. Thus, for example, when time data is stored as the communication data from the external apparatus into the auxiliary storage unit, the remote control may display the time without operation of buttons.

In a seventh aspect of the remote control for the air conditioner, when the controller (36) stores the new communication data in the auxiliary storage unit (42a) as the external communication unit (45) communicates with the external apparatus after the remote control (30) is turned ON, if the new communication data is for other than the setting of the remote control (30), the controller (36) may forward the new communication data outside via the communication port (31).

In the seventh aspect, the controller changes into the operating state after the remote control is turned ON. Then, when new communication data is stored from the external apparatus into the auxiliary storage unit via the external communication unit, if the new communication data is for the setting of, for example, an address of an external indoor unit, the remote control may set the address on the indoor unit without operation of a button.

An air conditioner in an eighth aspect includes the remote control (30) for the air conditioner.

In the eighth aspect, an air conditioner including a remote control capable of setting various kinds of data without operation of a button may be obtained.

Advantages of the Invention

The remote control for an air conditioner according to the first aspect may receive and hold various kinds of data previously set on the external apparatus even when no power is supplied to the controller.

Moreover, the second aspect makes it possible to store the communication data on the external apparatus in the remote control without operation of a button, even when the remote control is OFF.

Furthermore, the third aspect makes it possible to reflect, for example, a brightness and a contrast value of the remote control at, for example, setting of an initial operation of the remote control when the remote control is turned ON.

If the communication data is not for the setting of the remote control, the fourth aspect makes it possible to forward the communication data outside via the communication port. Thus, in the building multi air-conditioning system, addresses stored in the corresponding many remote controls may be transferred from the remote controls to the indoor units, the outdoor units, or the centralized apparatus.

In addition, the fifth aspect allows the protector to secure data communication between the external communication unit and the external apparatus when the remote control is OFF.

After the controller is activated because the remote control is turned ON, the sixth aspect allows the remote control to display, for example, the time without operation of a button.

After the controller is activated because the remote control is turned ON; that is, for example, when an address to be set for an external indoor unit is stored in the auxiliary storage unit, the seventh aspect makes it possible to forward the address to the external indoor unit such that the address may be set without operation of a button of the remote control.

The eighth aspect makes it possible to obtain an air conditioner including a remote control capable of setting various kinds of data without operation of a button.

BRIEF DESCRIPTION OF THE DRAWINGS

FIG. 5 is a flowchart showing data write setting when power is turned ON.

FIG. 6 is a flowchart showing data write setting after power is turned ON.

DETAILED DESCRIPTION

An Embodiment of the present invention will be described in detail below, with reference to the drawings. The following embodiment is merely a preferred example in nature, and is not intended to limit the scope, applications, or use of the invention.

(Embodiment)

Figure 1:
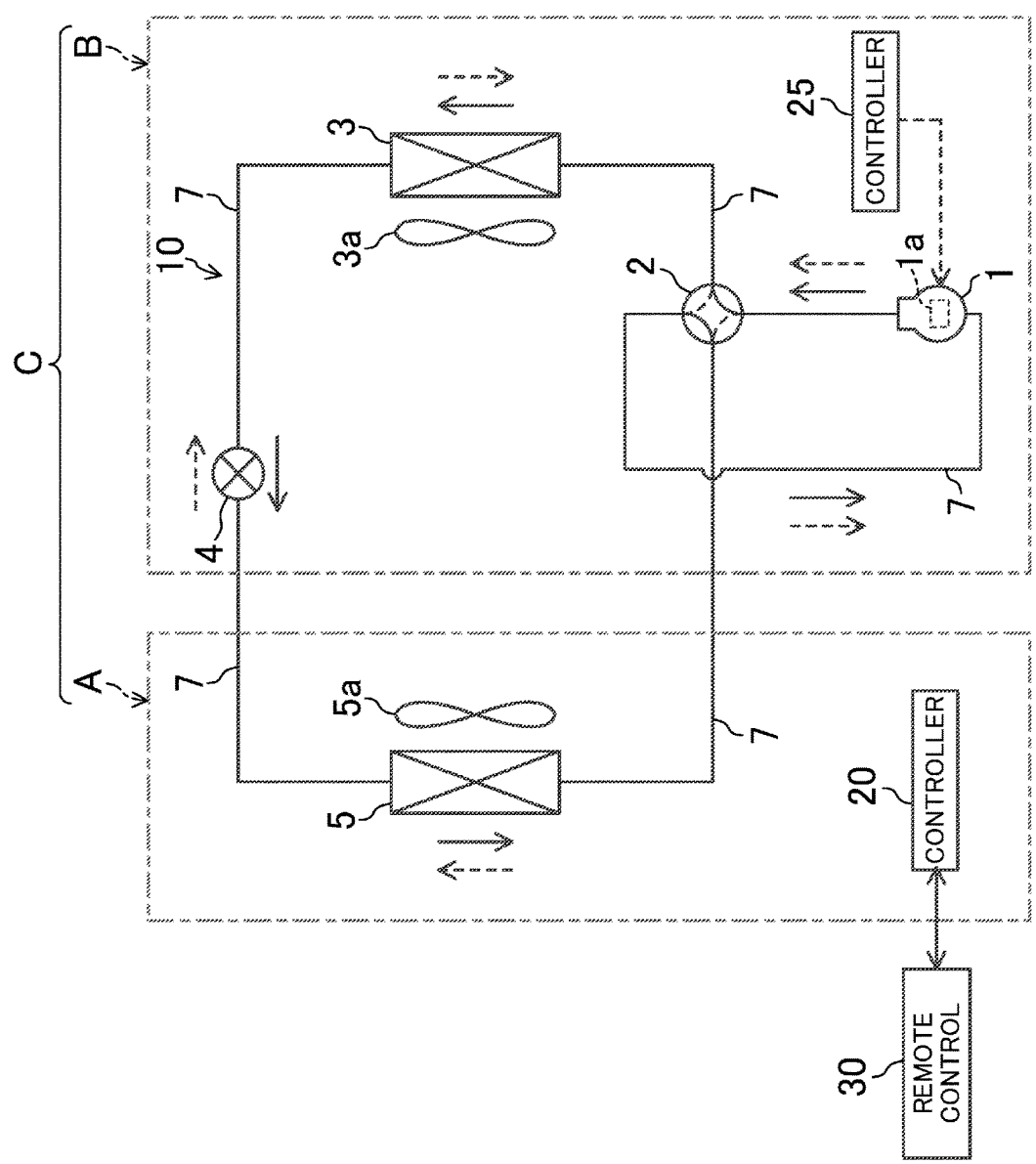
FIG. 1 is a diagram illustrating a refrigerant circuit of an air conditioner including a remote control according to an embodiment of the present invention.

FIG. 1 is a diagram illustrating a refrigerant circuit of an air conditioner including a remote control according to an embodiment of the present invention.

In FIG. 1, (A) denotes an indoor unit, and (B) denotes an outdoor unit. The indoor unit (A) and the outdoor unit (B) constitute an air conditioner (C). The outdoor unit (B) includes: a compressor (1) containing a motor (1a); a four-way switching valve (2); an air-cooled outdoor heat exchanger (3) having an air-cooling fan (3a); and an electric expansion valve (4) having a valve body driven by a pulse motor so that a degree of opening of the electric expansion valve (4) can be changed. Meanwhile, the indoor unit (A) includes an air-cooled indoor heat exchanger (5) having an air-cooling fan (5a).

The compressor (1), the four-way switching valve (2), the outdoor heat exchanger (3), and the electric expansion valve (4) included in the outdoor unit (B), and the indoor heat exchanger (5) included in the indoor unit (A) are connected to a refrigerant pipe (7) to form a closed circuit, and constitute a refrigerant circuit (10) to provide a refrigeration cycle.

When the refrigerant circuit (10) is in a heating operation mode, the four-way switching valve (2) is switched as illustrated with a dashed line. Thus, a refrigerant flows as indicated with dashed arrows, and is from the compressor (1) to the indoor heat exchanger (5). This indoor heat exchanger (5) exchanges heat between the refrigerant and indoor air, so that the refrigerant dissipates heat and the room is warmed. After that, while the electric expansion valve (4) adjusts a flow rate and a pressure of the refrigerant, the outdoor heat exchanger (3) exchanges heat between the refrigerant and outdoor air so that the refrigerant absorbs the heat. Then, the refrigerant returns to the compressor (1) in the form of a gaseous refrigerant. In the heating operation mode, this process is repeated.

When the refrigerant circuit (10) is in a cooling operation mode, the four-way switching valve (2) is switched as illustrated with a solid line. Thus, the refrigerant flows as indicated with solid arrows, and is sent from the compressor (1) to the outdoor heat exchanger (3). This outdoor heat exchanger (3) exchanges heat between the refrigerant and outdoor air so that the refrigerant dissipates the heat. After that, while the electric expansion valve (4) adjusts a flow rate and a pressure of the refrigerant, the indoor heat exchanger (5) exchanges heat between the refrigerant and indoor air so that the refrigerant absorbs the heat and the room is cooled. Then, the refrigerant returns to the compressor (1) in the form of a gaseous refrigerant. In the cooling operation mode, this process is repeated.

Moreover, the indoor unit (A) includes a controller (20). In addition, the outdoor unit (B) also includes a controller (25). The controller (20) of the indoor unit (A) and the controller (25) of the outdoor unit (B) may mutually communicate with each other.

The controller (25) of the outdoor unit (B) is connected to the motor (1a) of the compressor (1), the air-cooling fan (3a) of the outdoor heat exchanger (3), and the electric expansion valve (4). This controller (25) controls a rotation speed of the motor (1a) of the compressor (1), a rotation speed of the air-cooling fan (3a) of the outdoor heat exchanger (3), and a degree of opening of the electric expansion valve (4). Meanwhile, the controller (20) of the indoor unit (A) is connected to the air-cooling fan (5a) of the indoor heat exchanger (5). This controller (20) controls the rotation speed of the air-cooling fan (5a).

Furthermore, a remote control (30) is connected to the controller (20) of the indoor unit (A). The remote control (30) includes multiple buttons (not shown). An operator in a room operates the buttons to instruct the air conditioner (C) to perform cooling operation or heating operation, and set a temperature and a volume of air of the room in the performed operation.

Figure 2:
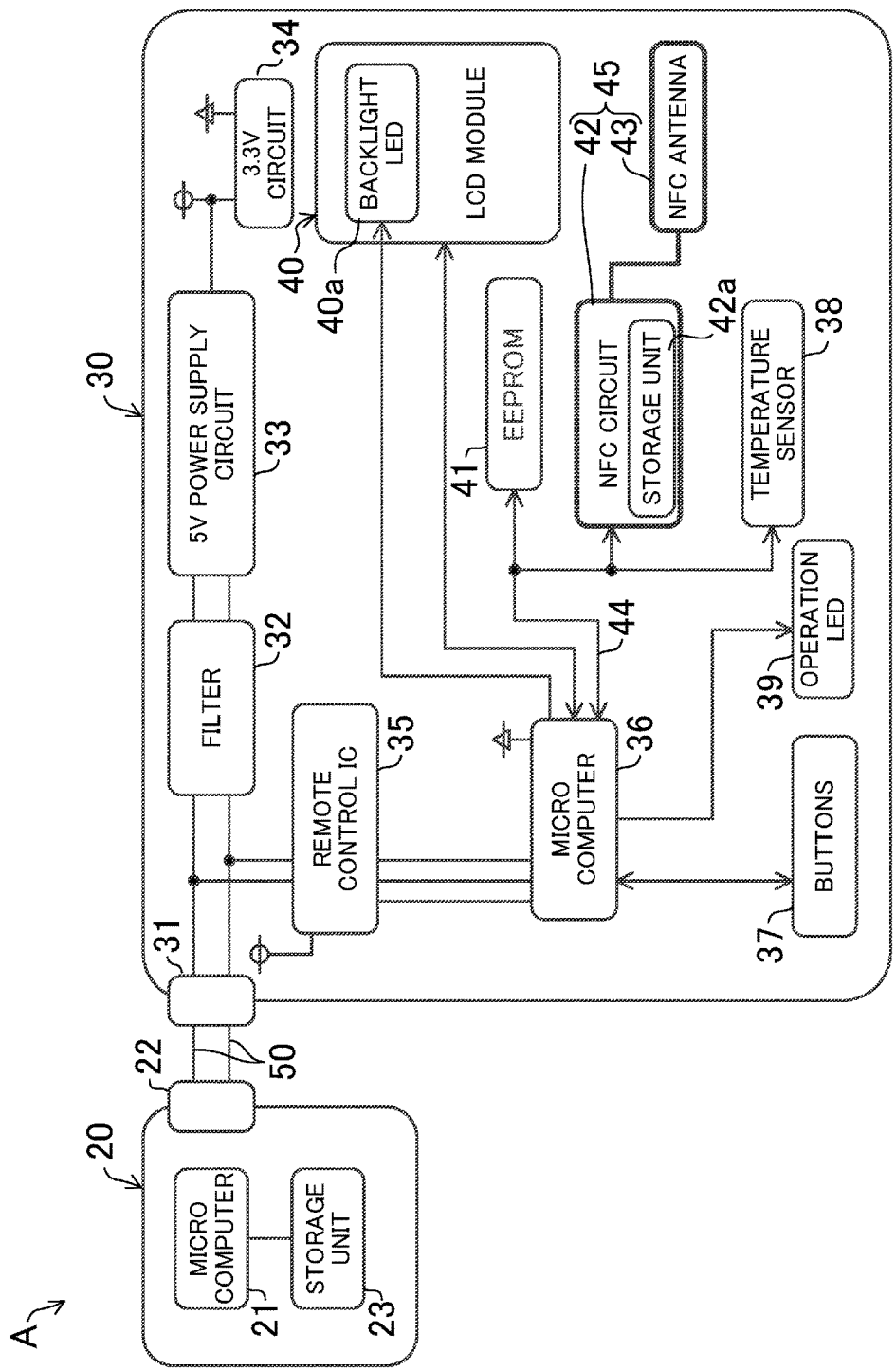
FIG. 2 is a block diagram illustrating an internal schematic configuration of an indoor unit and the remote control included in the air conditioner.

FIG. 2 illustrates an internal schematic configuration of the controller (20) and the remote control (30) of the indoor unit (A).

In FIG. 2, the controller (20) and the remote control (30) of the indoor unit (A) are connected to each other via a wire (50). The controller (20) includes a microcomputer (21), a communication port (22), and a storage unit (23). The microcomputer (21) (i) establishes data communication with the remote control (30) via the communication port (22), (ii) receives a command for either cooling operation or heating operation to be transmitted from the remote control (30), and data such as a set indoor temperature and a set volume of air in the operation of the transmitted command, and (iii) stores the set data in the storage unit (23). Furthermore, the controller (20) communicates with the controller (25) of the outdoor unit (B) so that the indoor unit (A) performs either the cooling or heating operation depending on the transmitted command, and causes the controller (25) of the outdoor unit (B) to switch the four-way switching valve (2). Meanwhile, the controller (20) receives an actual indoor temperature from a temperature sensor (to be described later)

provided to the remote control (30), controls the rotation speed of the air-cooling fan (5a) of the indoor heat exchanger (5) of the indoor unit (A), and communicates with the controller (25) of the outdoor unit (B). The controller (25) of the outdoor unit (B) controls the following factors of the of the outdoor unit (B): the rotation speed of the motor (1a) of the compressor (1), the rotation speed of the air-cooling fan (3a) of the outdoor heat exchanger (3), and the degree of opening of the electric expansion valve (4).

<Configuration of Remote Control (30)>

Meanwhile, the remote control (30) is supplied with DC voltage power from the indoor unit (A) via the wire (50). In the wire (50), the DC voltage and the communication data between the remote control (30) and the controller (20) are superimposed.

The remote control (30) contains a communication port (31) connected to the wire (50), a filter (32), a 5V power supply circuit (33), a 3.3V circuit (34), a remote control communication integrated circuit (IC) (35), a microcomputer (36), and buttons (37). The buttons (37) include a power button, a cooling/heating operation button, a temperature setting button, a volume-of-air setting button, and a direction-of-air setting button. Moreover, the remote control (30) includes a temperature sensor (38) detecting an indoor temperature, an operation light-emitting diode (LED) (39) for indicating operation, an liquid crystal display (LCD) module (40) having a backlight LED (40a) for lighting an LCD, an electrically erasable programmable read-only memory (EEPROM) (41) acting as a main storage unit, an NFC circuit (42) containing a storage unit (42a), and an NFC antenna (43).

Of the DC voltage and the communication data to be supplied to the remote control (30) via the wire (50) and the communication port (31), the filter (32) allows the DC voltage to pass through the filter (32) and enter the 5V power supply circuit (33). The 5V power supply circuit (33) generates a DC voltage of 5V from the DC voltage passing through the filter (32). The 3.3V circuit (34) steps down the voltage of 5V generated by the 5V power supply circuit (33) to a voltage of 3.3V. The remote control communication IC (35) operates on the voltage of 5V generated by the 5V power supply circuit (33), and communicates with the controller (20) of the indoor unit (A) via the wire (50), using setup data. The setup data includes the cooling operation command, the heating operation command, a set room temperature, an actual room temperature, and a volume-of-air setting.

Moreover, the microcomputer (controller) (36) is ready to operate when receiving the voltage of 3.3V generated by the 3.3V circuit (34). The microcomputer (36) transmits data to the controller (20) of the indoor unit (A) via the remote control communication IC (35) and the communication port (31). The data includes: the cooling operation command, the heating operation command, the set room temperature, and the volume-of-air setting sent from the buttons (37); the actual room temperature sent from the temperature sensor (38), and data stored in the EEPROM (41). Moreover, the microcomputer (36) carries out parallel communication of eight bits with the LCD module (40), and commands the LCD module (40) to display, on the LCD of the remote control (30), the cooling operation command, heating operation command, set room temperature, and volume of air. Moreover, when ready to operate by the power supplied from the 3.3V circuit (34), the microcomputer (36) reads out data stored in the storage unit (42a) of the NFC circuit (42).

If the data stored in the storage unit (42a) of the NFC circuit (42) is for setting of the remote control (30), the microcomputer (36) forwards the data to the EEPROM (41) to reflect the setting. On the other hand, if the data stored in the storage unit (42a) of the NFC circuit (42) is for setting of the indoor unit (A), the microcomputer (36) forwards the setting to the microcomputer (21) of the indoor unit (A) via the remote control communication IC (35), the communication port (31), and the wire (50). Then, the microcomputer (21) of the indoor unit (A) forwards the setting to the storage unit (23) of the indoor unit (A).

The EEPROM (41) is connected to the microcomputer (36) via a bidirectional bus (44) of, for example, a two-wire system. Through this bidirectional bus (44), the data is stored from the microcomputer (36) into the EEPROM (41), and the stored data is read out to the microcomputer (36). Examples of the stored data include such operating states as cooling operation, heating operation, a set room temperature, and a volume of air. These operating states are used when the remote control (30) returns after the power is shut down. In addition, display setting such as language, a history of malfunctions, and a communications log are also stored.

Furthermore, the NFC circuit (42) and NFC antenna (43) are characteristics of this embodiment. The NFC antenna (43) receives data transmitted with a radio wave from an antenna of a reader/writer such as an NFC circuit and an NFC antenna contained in an external apparatus (not shown) such as a microcomputer provided close to the remote control (30). The received radio wave causes electromagnetic induction, which allows the NFC (43) antenna to receive power supply and generate power.

The NFC circuit (42) is connected to the NEC antenna (43). The NFC circuit (42) is also connected to the microcomputer (36) via the bidirectional bus (44).

Figure 3:
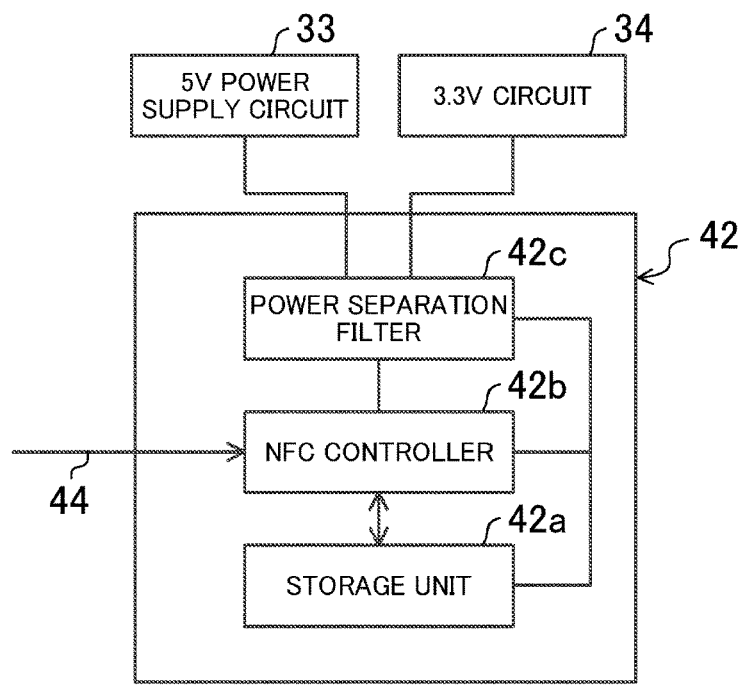
FIG. 3 is a block diagram illustrating an internal configuration of an NFC circuit contained in the remote control.

As illustrated in FIG. 3, the NFC circuit (42) contains the storage unit (42a) acting as an auxiliary storage unit, an NFC controller (42b), and a power separation filter (42c). The storage unit (42a) is smaller in storage capacity than the EEPROM (41). The NFC circuit (42) does not contain a battery. Upon reception of the power generated by the NFC antenna (43), the NFC controller (42b) and the storage unit (42a) operate, and the NEC controller (42b) stores in the storage unit (42a) the data sent from the external apparatus and received by the NFC antenna (43). Moreover, using the power generated by the NFC antenna (43), the NFC circuit (42) transmits the data in the storage unit (42a) with a radio wave from the NFC antenna (43) to the external apparatus. Here, the external apparatus receives the radio wave sent from the NFC antenna (43) with an antenna of a built-in reader/writer, and takes the data from the received radio wave, using a controller included in the reader/writer.

Hence, the NFC circuit (42) and the NFC antenna (43) function as an external communication unit (45) having the following features: Regardless whether the microcomputer (36) in the remote control (30) is not supplied with power from the 3.3V circuit (34) (i.e., the microcomputer (36) is in the non-operating state), or the microcomputer (36) is supplied with power (i.e. the microcomputer (36) is in the operating state), the external communication unit (45) is independently supplied with power by the radio wave received from the external apparatus to generate power, and communicates with the external apparatus. The external communication unit (45) stores information (data), included in the radio wave received from the external apparatus, in the auxiliary storage unit (42a) included in the external communication unit (45).

Moreover, when setup data is stored in the storage unit (42a), the NFC controller (42b) of the NFC circuit (42) outputs an interrupt signal to the bidirectional bus (44).

Moreover, the power separation filter (42*c*) functions as a protector which: blocks the power voltage, generated when the NFC antenna (43) receives the radio wave from the external apparatus, from being supplied to the 5V power supply circuit (33) and the 3.3V circuit (34) to reduce the risk that, for example, the microcomputer (36) improperly operates by the power voltage generated by the NFC antenna (43); and provides a protection so that only the NFC circuit (42) operates.

<Setting Data on Remote Control (30)>

Described next is operation of setting various kinds of data on the remote control (30).

An initial data setting is carried out at a phase in which the remote control (30) and the indoor unit (A) are not connected with the wire (50) (i.e., the remote control (30) is left alone), and the microcomputer (36) in the remote control (30) is not supplied with power and thus is in a non-operating state.

Hereinafter, the setting is described as various kinds of data to be set on the remote control (30) are to be previously stored in the external apparatus.

Figure 4:
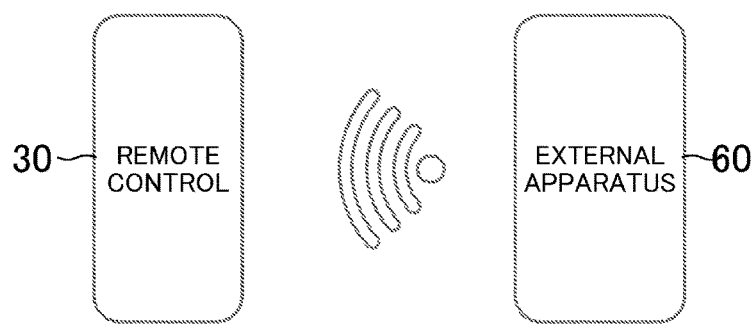
FIG. 4 is a schematic view illustrating a state of near field communication between the remote control and an external apparatus.

First, as illustrated in FIG. 4, the remote control (30) and the external apparatus (60) are placed close to each other. Specifically, the NFC antenna (43) of the remote control (30) and a reader/writer (not shown) included in an external apparatus (60) are placed close to each other. Here, the external apparatus (60) transmits setup data with a radio wave to the NFC antenna (43), and the transmitted setup data is stored in the auxiliary storage unit (42*a*) included in the NFC circuit (42). Note that examples of the external apparatus (60) include a personal computer (PC) and a smart phone.

The setup data to be transmitted from the external apparatus (60) relates to the indoor unit (A). Examples of the setup data include, specifically, (i) addresses (addresses in collective address setting) to be set for respective rooms in a building multi-air-conditioning system, (ii) display appearance setting such as a backlight setting value and a contrast setting value for, for example, a brightness of a backlight LED (40*a*) included in the LCD module (40) of the remote control (30), (iii) data for displaying a temperature in Celsius or Fahrenheit, (iv) data for displaying which one of languages is to be displayed; and data for determining whether the indoor unit (A) is installed on a high ceiling.

In the collective address setting in the building multi-air-conditioning system, many remote controls (30) provided to many rooms are brought to, for example, one place in one room. Moreover, a rule for a change of address (e.g., the addresses are to be changed in ascending or descending order) is previously stored in the external apparatus (60). Then, the NFC antenna (43) of the first remote control (30) and the external apparatus (60) carry out near field communication, such that the first address is stored in the auxiliary storage unit (42*a*) of the remote control (30). After that, such a process is repeated so that the external apparatus (60) sequentially assigns the subsequent address to the subsequent remote control (30) in the same manner according to the above rule. Hence, the addresses are sequentially stored in the corresponding auxiliary storage units (42*a*) in NFC circuits (42) for many remote controls (30) each including a microcomputer (36) in a non-operating state.

When the address setting using the NFC circuit (42) and the NFC antenna (43) of the remote control (30), the display appearance setting for, for example, a brightness of the backlight LED (40*a*), and further, the setting of the data for displaying a temperature in Celsius or Fahrenheit end, the remote controls (30) are brought into respective rooms. Each of the remote controls (30) is connected via the wire (50) to a corresponding one of the indoor units (A) placed in the respective rooms. Thus, the remote control (30) is installed in the room. Hence, each remote control (30) receives power via the wire (50) from the corresponding indoor unit (A). After that, when the power button of the buttons (37) is operated, the microcomputer (36) in the remote control (30) is ready to operate.

Figure 5:
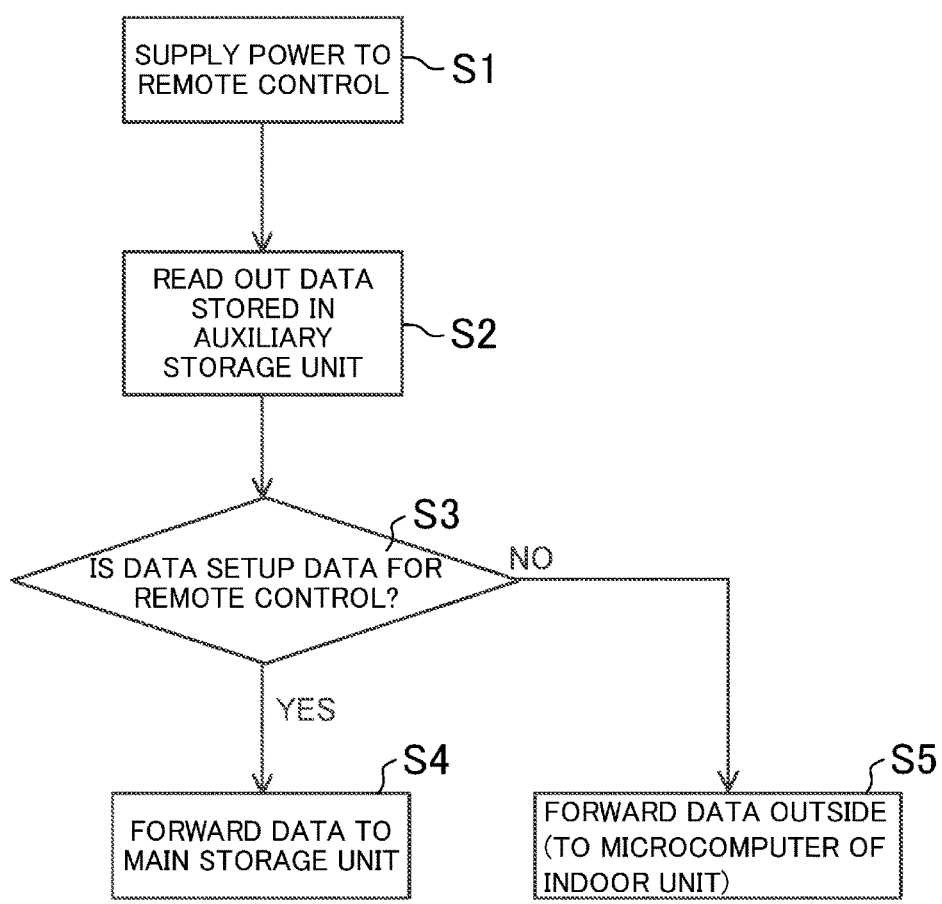

Then, as a flowchart showing a data write setting when power is turned ON illustrates in FIG. 5, when the remote control (30) is supplied with power from the indoor unit (A), and the microcomputer (36) is ready to operate (Step S1), the microcomputer (36) reads out by itself the data stored in the auxiliary storage unit (42*a*) of the NFC circuit (42) (Step S2). If the stored data read out is the setup data for the remote control (30), such as the backlight setting and the contrast setting for, for example, a brightness of the backlight LED (40*a*) included in the LCD module (40) (YES in Step S3), the microcomputer (36) forwards the setup data to the EEPROM (a main storage unit) (41) to reflect the data (Step S4). Furthermore, if the stored data read out is not the setup data for the remote control (30), such as data (e.g., the address of the indoor unit (A)) required for setting and operation of the indoor unit (A) connected to the remote control (30) (NO in Step S3), the microcomputer (36) forwards the data to the microcomputer (21) of the indoor unit (A) via the remote control communication IC (35), the communication port (31), and the wire (50). The microcomputer (21) of the indoor unit (A) stores the forwarded data in the storage unit (23).

Figure 6:
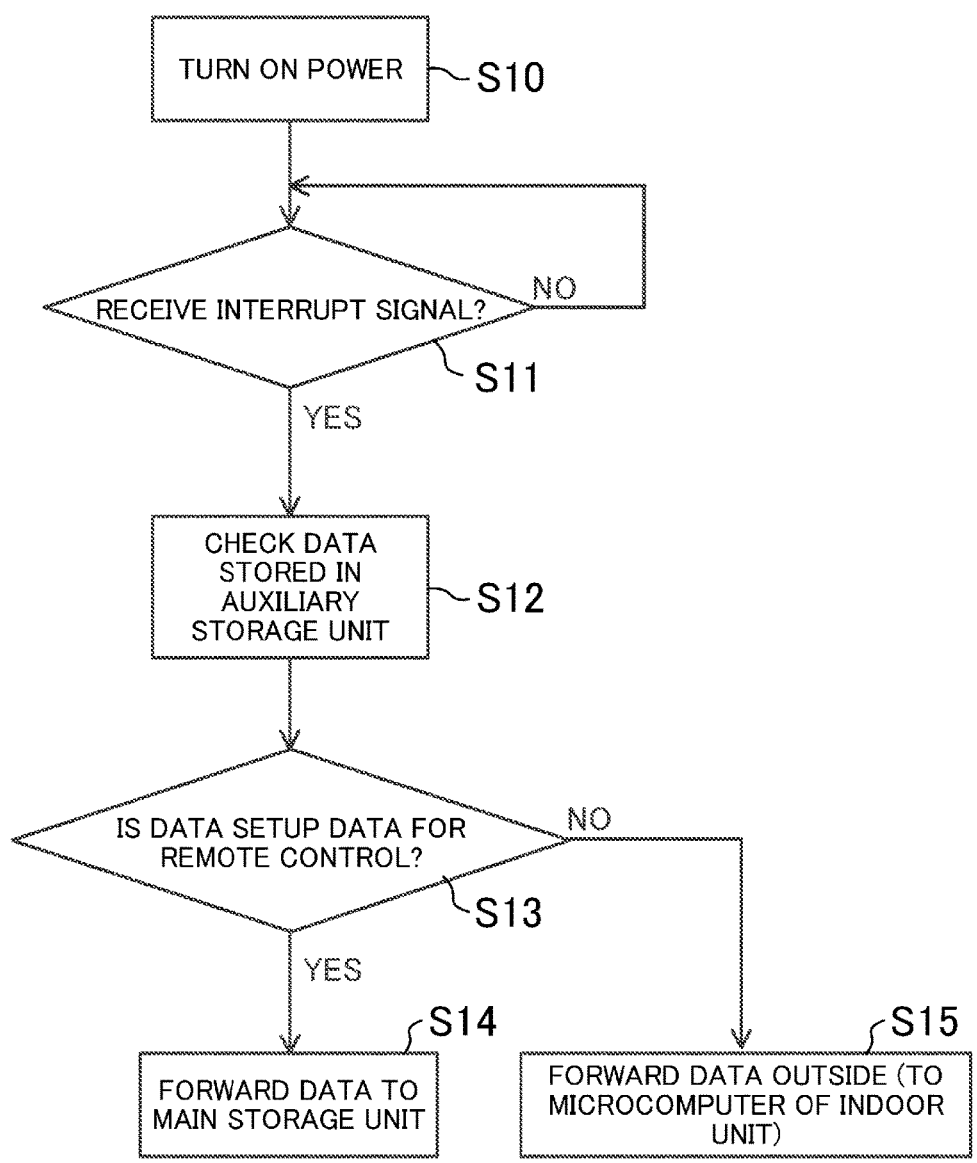

After that, as a flowchart showing a data write setting after power is turned ON (after the data write setting when the power is turned ON) illustrates in FIG. 6, when the remote control (30) is ON (i.e., when the microcomputer (36) is in the operating state) (Step S10), another data setting required for the remote control (30) is carried out through near field communication between the above NFC circuit (42) and NFC antenna (43) and the external apparatus (60). Such data is stored in the auxiliary storage unit (42*a*) in the NFC circuit (42). Examples of this setup data include a time setting, and various on-sight settings, including individual direction-of-air setting for each indoor unit (A). The time setting includes setting year, month, date, time, presence or absence of summer time, and position information using a global positioning service (GPS).

When the setup data, such as the time setting, is stored from the external apparatus (60) into the auxiliary storage unit (42*a*) of the NFC circuit (42), the NFC circuit (42) outputs an interrupt signal to the bidirectional bus (44). When receiving the interrupt signal from the NFC circuit (42) (Step S11), the microcomputer (36) checks the data stored in the auxiliary storage unit (42*a*) in the NFC antenna (43) (Step S12). If a change is found in the data when the stored data is for the setting of the remote control (30) (YES in Step S13), the microcomputer (36) transfers the change in the data to the EEPROM (41) via the bidirectional bus (44) to reflect the change (Step S14). Meanwhile, if the data stored in the auxiliary storage unit (42*a*) is not for the setting of the remote control (30) (NO in Step S13); that is, the change is made to setup data related to, for example, the indoor unit (A), the setup data is transferred to the microcomputer (21) of the indoor unit (A) via the communication port (31) and the wire (50) (Step S15). The microcomputer (21) stores the data in the storage unit (23).

Note that after the remote control (30) is turned ON and the microcomputer (36) changes into the operating state, the operator operates, as a matter of course, the buttons (37) on the body of the remote control (30) to set various kinds of data, such as setting the time.

Moreover, after the microcomputer (36) of the remote control (30) changes into the operating state, the microcomputer (36) may cause the NFC circuit (42) and the NFC antenna (43) to carry out near field communication with the external apparatus (60) so that the setup data transmitted from the external apparatus (60) is (i) directly stored in the EEPROM (the main storage unit) (41), not in the auxiliary storage unit (42a) in the NFC circuit (42), and (ii) directly forwarded to the microcomputer (21) of the indoor unit (A).

<Advantages of Embodiment>

In this embodiment, even if the remote control (30) is not connected to the indoor unit (A) such that the microcomputer (36) is not supplied with power, the NFC circuit (42) and the NFC antenna (43) of the remote control (30) establish near field communication with the external apparatus (60). Such a feature makes it possible to store various kinds of data, including an address in collective address setting in a building multi-air-conditioning system and the selection of either Celsius or Fahrenheit for displaying a temperature, from the external apparatus (60) into the data in the auxiliary storage unit (42a) in the NFC circuit (42). Hence, the operator may easily set the various kinds of data, eliminating the need for a repetitive operation of the buttons (37) of the remote control (30) as typically carried out.

Particularly, in the collective address setting in the building multi-air-conditioning system, many remote controls (30) and the external apparatus (60) are prepared, for example, on a work table in a predetermined room, and the remote controls (30) are sequentially placed closer one by one to the external apparatus (60) to carry out the near field communication. Simply repeating such a process makes it possible to store a predetermined address in the auxiliary storage unit (42a) of the NFC circuit (42) in each remote control (30). The process eliminates a typical trouble in which the operator brings the remote controls (30) into respective rooms, connects each remote control (30) to the corresponding indoor unit (A) in the room with the wire (50), and set, using the buttons (37), various kinds of data on each remote control (30) supplied with power.

Furthermore, whether or not the microcomputer (36) is supplied with power, the NFC circuit (42) of the remote control (30) is ready to operate, separately from the operation of the microcomputer (36), upon receiving power supply from the external apparatus (60) via the near field communication with the external apparatus (60). Thanks to this feature, various kinds of setup data received from the external apparatus (60) is reliably stored in the auxiliary storage unit (42a) included in the NFC circuit (42).

Moreover, after the setting of the various kinds of data via the near field communication between the remote control (30) and the external apparatus (60), the remote control (30) is supplied with power from the indoor unit (A) via the wire (50). At this moment, if the microcomputer (36) is ready to operate and the setup data stored in the auxiliary storage unit (42a) of the NFC circuit (42) is for the remote control (30), the setup data is forwarded to the EEPROM (41). If the setup data is not for the remote control (30), the setup data is transferred to, for example, the indoor unit (A) placed outside. Thus, as setting various kinds of data using the buttons (37), without operation of the buttons (37), the remote control (30) may reflect the setup data for a brightness and a contrast value of the LCD of the remote control (30), and forward various kinds of data, including the address of the remote control (30) itself, from the remote control (30) to the indoor unit (A) via the wire (50).

In addition, the power voltage generated by the NFC antenna (43) is blocked by the power separation filter (42c) from entering the 5V power supply circuit (33) and the 3.3V circuit (34). Thus, the power voltage generated by the NFC antenna (43) is used only for the operation of the NFC circuit (42), such that the various kinds of data transmitted from the external apparatus (60) is reliably stored in the auxiliary storage unit (42a), and when the remote control (30) is not supplied with power, the microcomputer (36) is kept from improper operation.

Furthermore, when setup data for the remote control (30) such as time data and setup data for other than the remote control (30) such as the indoor unit (A) are stored in the auxiliary storage unit (42a) of the NFC circuit (42) through the near field communication between the remote control (30) and the external apparatus (60) after the remote control (30) is supplied with power via the wire (50), the microcomputer (36) ready to operate forwards to the EEPROM (41) the setup data stored in the auxiliary storage unit (42a) for the remote control (30). At this point, the remote control (30) may display the setup data for the remote control (30) such as the time data, and transfer the setup data for other than the remote control (30), such as the indoor unit (A), to the indoor unit (A) via the communication port (31).

As can be seen, an air conditioner including: the remote control (30) which facilitates setting of various kinds of data through the near field communication with the external apparatus (60); the indoor unit (A); and the outdoor unit (B) may be obtained.

(Other Embodiments)

The above embodiment of the present invention may be configured as follows.

In the above embodiment, the remote control (30) includes, but not limited to, the NFC circuit (42) and the NFC antenna (43) to carry out the near field communication with the external apparatus (60). Instead, the remote control (30) may include a radio frequency (RF) tag IC of a radio frequency identifier (RFID) with widespread use of radio waves and magnetic fields. Furthermore, other than wireless communication, the remote control (30) and the external apparatus (60) are connected to each other via a universal serial bus (USB) connection cable. While supplied with power from the external apparatus (60), the remote control (30) may store various kinds of data in the external apparatus (60) into an auxiliary storage unit included in the remote control (30). Here, the remote control (30) needs to include, other than the microcomputer (36), a controller such as a microcomputer dedicated to the communication with the external apparatus (60).

Furthermore, the setup data to be stored in the EEPROM (the main storage unit) (41) may be a value itself of data for communication with the external apparatus (60). The setup data may also be a set value into which the communication data is converted, and a program for updating the microcomputer (the controller) (36).

INDUSTRIAL APPLICABILITY

As can be seen, the present invention includes an external communication unit which may communicate with an external apparatus even when no power is supplied to a controller in a remote control, so that various kinds of data may be set without operation of buttons many times. The present invention is useful when applied to a remote control used for, for example, a building multi-air-conditioning system and an air conditioner including the remote control.

DESCRIPTION OF REFERENCE CHARACTERS

A Indoor Unit
B Outdoor Unit
C Air Conditioner
30 Remote Control
31 Communication Port
36 Microcomputer (Controller)
37 Buttons
41 EEPROM (Main Storage Unit)
42 NFC Circuit
42*a* Storage Unit (Auxiliary Storage Unit)
42*b* NFC Controller
42*c* Power Separation Filter (Protector)
43 NFC Antenna
45 External Communication Unit
60 External Apparatus

The invention claimed is:

1. An air conditioner, comprising:
an external communication unit capable of communicating with an external apparatus even when a controller is not supplied with power, the external apparatus being different from the air conditioner;
an auxiliary storage unit in which communication data obtained by the external communication unit through communication with the external apparatus is stored; and
a main storage unit storing remote control setup information,
wherein the controller, upon being supplied with power, is configured to
read data stored in the auxiliary storage unit,
store, when the read data is setting data for a remote control, the read data in the main storage unit, and
transmit, when the read data is not setting data for the remote control, the read data from the auxiliary storage unit to an indoor unit or outdoor unit of the air conditioner.

2. The air conditioner of claim 1, wherein the external communication unit communicates with the external apparatus separately from operation of the controller, and stores the communication data in the auxiliary storage unit.

3. The air conditioner of claim 1, wherein the controller is supplied with the power when the remote control is turned ON, reads out the communication data stored in the auxiliary storage unit as the external communication unit communicates with the external apparatus, reflects setting of the remote control if the communication data is for the setting, and stores the communication data in the main storage unit.

4. The air conditioner of claim 1, further comprising
a protector protecting, when the remote control is OFF, the controller from an effect of power required for the external communication unit to communicate with the external apparatus.

5. The air conditioner of claim 1, wherein when the controller stores new communication data in the auxiliary storage unit as the external communication unit communicates with the external apparatus after the remote control is turned ON, the new communication data is stored in the main storage unit and if the new communication data is for the setting of the remote control, the controller reflects the setting.

6. The air conditioner of claim 1, wherein the controller is provided in the remote control.

* * * * *